United States Patent [19]
Wight

[11] 3,859,019
[45] Jan. 7, 1975

[54] STICK INSERTION APPARATUS
[75] Inventor: Edward M. Wight, Austin, Tex.
[73] Assignee: Glacier Industries, Inc., Austin, Tex.
[22] Filed: Mar. 13, 1973
[21] Appl. No.: 340,649

[52] U.S. Cl. ............... 425/126 S, 425/517, 425/154
[51] Int. Cl. ............................................. F25c 7/22
[58] Field of Search ......... 425/517, 126 S, 136, 154

[56] References Cited
UNITED STATES PATENTS

| | | | |
|---|---|---|---|
| 1,899,238 | 2/1933 | Kirchhoff | 425/154 |
| 1,960,456 | 5/1934 | Robb | 425/126 S X |
| 2,001,026 | 5/1935 | Kirchhoff | 425/154 |
| 3,221,673 | 12/1965 | Shelly | 425/126 S |
| 3,395,652 | 8/1968 | Conti | 425/126 S |
| 3,730,661 | 5/1973 | Tremblay | 425/126 S |

Primary Examiner—Francis S. Husar
Assistant Examiner—David S. Safran
Attorney, Agent, or Firm—Kenway & Jenney

[57] ABSTRACT

A reciprocating carriage is positioned alongside a conveyor for transporting food product bars. A cam operated drive system, synchronously connected, by a phase adjustable mechanical linkage, to the main conveyor drive, imparts a reciprocating motion to the carriage in a direction parallel to the conveyor. The drive cam is designed to provide a carriage cycle consiting of the following successive periods: an initial stationary period; an acceleration period; a period of constant velocity in which the carriage velocity equals the conveyor velocity; and a return period. Mounted on the carriage are a pair of pneumatically powered stick insertion pistons, each arranged to drive a stick into one of the moving bars during the constant velocity period. The drive system is connected to the carriage by a frictionally engaged drive bar. This bar is brought to bear against the carriage arm by a roller, pressed, by a pressurized piston, into a depression formed in the bar. The threshold pressure of the piston is adjusted so that the roller will be forced up and out of the depression if the carriage is restrained from moving, as it may be if it becomes jammed. Upon such an occurrence, a valve of the pneumatic circuit is activated retracting the piston, thereby disengaging the drive from the carriage and avoiding any damage to the machine.

5 Claims, 11 Drawing Figures

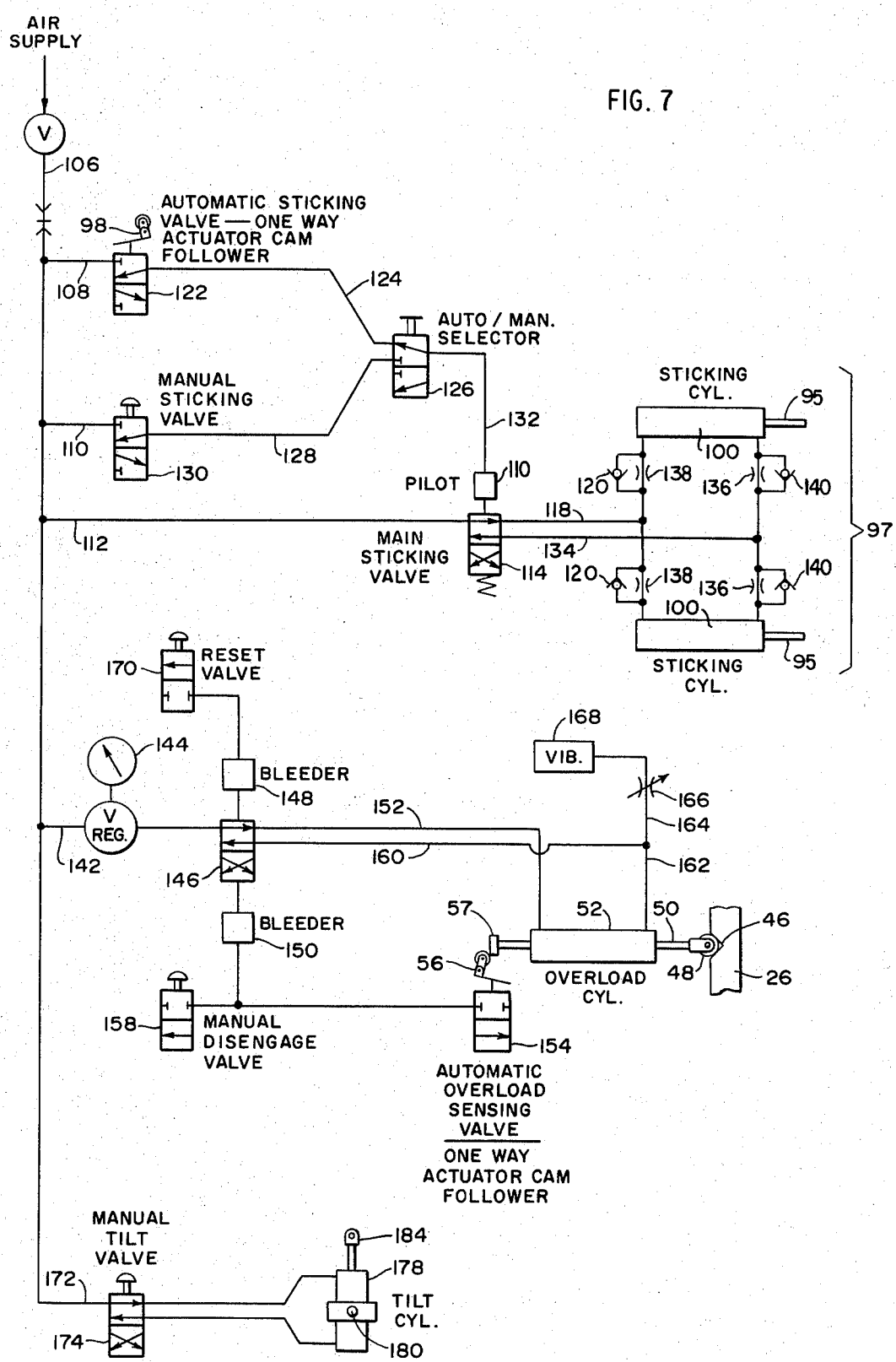

STICK INSERTION APPARATUS

BACKGROUND OF THE INVENTION

This invention relates in general to an apparatus for performing operations on food products as they are transported along a moving conveyor, and more particularly to a system for inserting sticks into the food products on the conveyor.

There are known in the prior art a number of systems for processing food products, which systems include a moving conveyor system. One such system is described in pending patent application Ser. No. 148,414 filed on June 1, 1971 now U.S. Pat. No. 3,761,213 and assigned to the assignee of all of the rights of the present invention. In such systems, extruded food products, which typically would be soft ice cream, are sliced into bars and dropped onto a series of conveyor plates which carry the extruded products to operational stations where additional modifications to the product may be carried out and thence, typically, into a freezing vault for hardening into frozen products. A number of ice cream products, so formed, include sticks, which must be inserted into the product while it is still in a soft state. One mechanism, for inserting these sticks, provides that the sticks be inserted into the extruded product prior to its being deposited onto a moving conveyor. This is done by spitting the sticks at relatively high speed into the extruded product before it is sliced into bars and deposited onto the conveyor. There are a number of drawbacks to this method. The stick must be ejected at high velocity, giving rise to penetration depth control problems and the extrusion cutter must be timed precisely to cut at the midpoint between previously inserted sticks. Additional problems arise from the impact of the soft extruded product, carrying the stick, on the product plate, in that the stick may be dislocated from its initial placement or may droop and thus present an undesirable finished product.

SUMMARY OF THE INVENTION

Broadly speaking in the present invention, a reciprocating carriage is located alongside the food product conveyor. This carriage is constructed for reciprocating motion in a direction parallel to the motion of the conveyor. The reciprocating motion is imparted to the carriage by a cam operated drive system that is synchronously connected to the main conveyor drive. The drive cam is designed to provide a carriage cycle consisting of the following successive periods: an initial stationary period; an acceleration period; a period of constant velocity, in which the carriage velocity equals the conveyor velocity; and a very short return period. The motion is transmitted to the carriage by a mechanical linkage connecting the carriage to a rotatable cam follower which rides against the outside edge of the cam. A sticking mechanism is mounted on the carriage such that sticks are fed into slots in the carriage when the carriage is in its stationary period. After the sticks are fed into the slots, the carriage is smoothly accelerated to match the speed of the conveyor in the second portion of its cycle. In the third, or constant velocity portion of the cycle, the carriage speed is precisely matched to the speed of the conveyor and the sticks are inserted into the moving food product bar. A pneumatic circuit supplies power to the stick inserters to trigger them at an appropriate time. It should be noted that since the stick insertion occurs during the constant velocity portion of the cycle, there is no relative velocity between the sticks and the food products in the direction parallel to the motion of the conveyor.

A problem commonly occuring, in stick insertion mechanisms, is the jamming of the sticks as they are fed from chutes into the insertion device proper. A feature of the present system is that the drive system for the carriage is connected to the carriage by means of a mechanical engagement, in that a drive bar, which is part of the drive system linkage, mechanically engages the carriage arm by means of a roller which is forced, by a pressurized piston, into a depression formed in the drive bar. The threshold pressure of the piston is set so that the roller is normally maintained in the depression and is only forced out of the depression when the carriage is restrained from moving, as it may be if jammed by improperly loaded sticks. On the occurrence of such a jam, the movement of the roller activates a pneumatic circuit and the piston is retracted, thereby disengaging the drive entirely from the carriage. The drive bar is then free to continue reciprocating without applying forces to the carriage, thereby avoiding damage to either the carriage or the drive system. After the stick jam is cleared, the carriage may be returned to its starting point and the pneumatic circuit is reactivated, repressurizing the piston to again bring the roller into pressure relationship against the drive bar. When the drive bar reaches the point in the cycle where the depression is aligned with the roller, the motion cycle of the carriage will again recommence.

The described arrangement avoids many of the problems associated with insertion of the sticks into the extruded stream prior to the product being deposited on the conveyor plates. Since there is no relative velocity parallel to the direction of movement of the plates, between the product and the sticks, relatively imprecise timing may be employed while achieving a precise location of the stick within the product. Again since the product is already fixed in position on the plate prior to the insertion of the stick, angular insertion of the stick and drooping of the stick are avoided. Since the reciprocating carriage is driven by the same drive system as the conveyor, the phase relationships between them may be precisely adjusted and the phasing of the cutter mechanism may be separately adjusted. While the drive system has been described specifically for use with a stick inserter, other conveyor associated devices such as cone fillers, decorators or candy depositors may be mounted on the carriage, in order to achieve modification of the food product during a period in which there is no relative velocity between the conveyor borne product and the mounted device.

BRIEF DESCRIPTION OF THE DRAWINGS

For a fuller understanding of the nature and objects of the invention, reference should be had to the following detailed description taken in connection with the accompanying drawings in which:

FIG. 7 is a schematic representation of a pneumatic circuit for the stick insertion mechanism, in accordance with this invention;

DESCRIPTION OF THE PREFERRED EMBODIMENT

Figure 1:
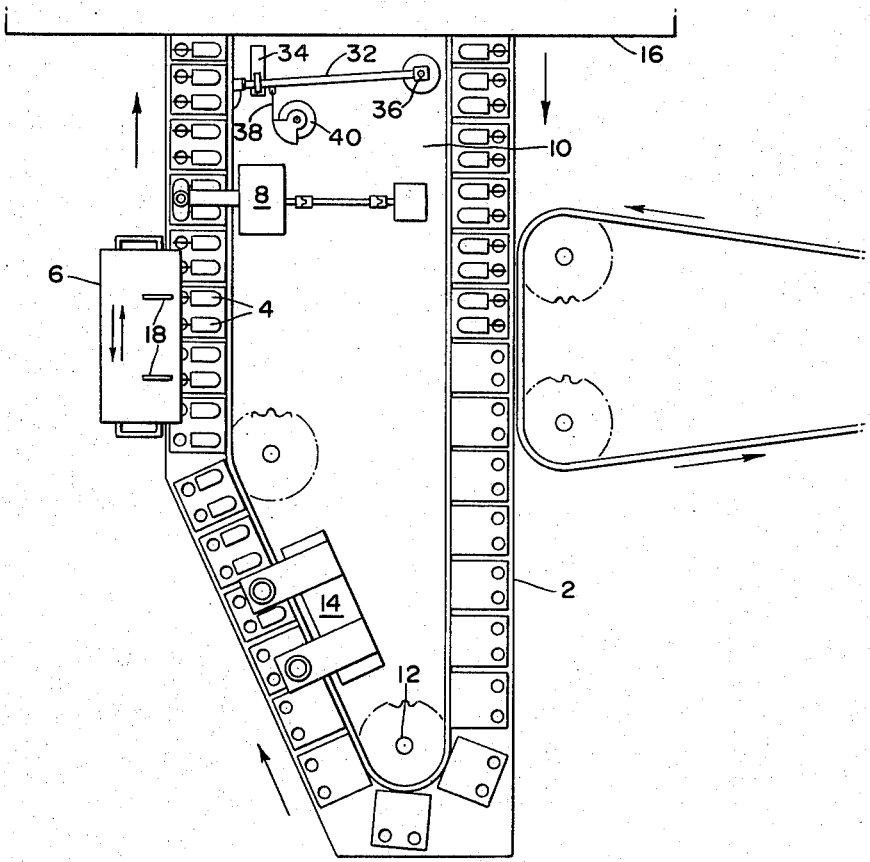
FIG. 1 is an overall plan view of the stick insertion mechanism, a cone filler and food processing conveyor, in accordance with this invention.

Referring to FIG. 1, a portion of an automatic food processing system is shown. An outside loop of a conveyor 2 passes around a main conveyor drive 12, an extruder 14, a sticker mechanism 6 and a cone filler 8, before re-entering the freezing vault 16. The extruder 14, the sticker mechanism 6 and the cone filler 8 are all mounted on the work table 10.

The extruder 14 deposits two food product bars 4, on each plate of conveyor 2. As the bars pass by sticker mechanism 6, it inserts a stick into each bar 4. If ice cream cones, instead of food product bars, are being conveyed, the sticker mechanism 6 can be removed and the cone filler 8 activated to fill a pair of cones at a time.

Figure 2:
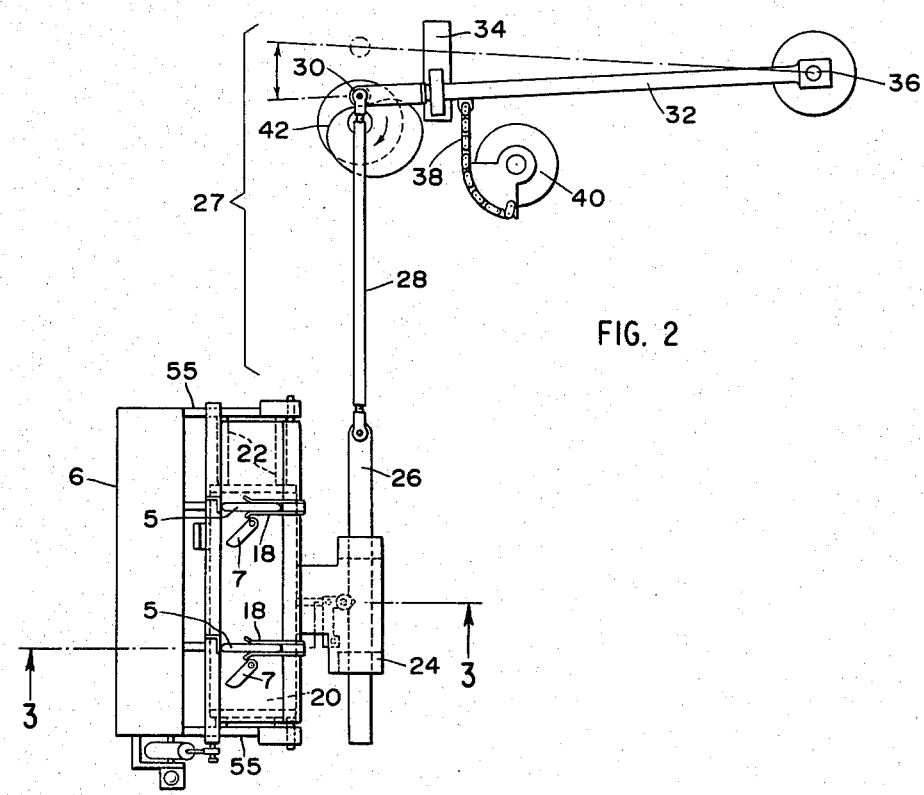
FIG. 2 is a plan view of the stick insertion mechanism and its cam operated drive system, in accordance with this invention.
Figure 3:
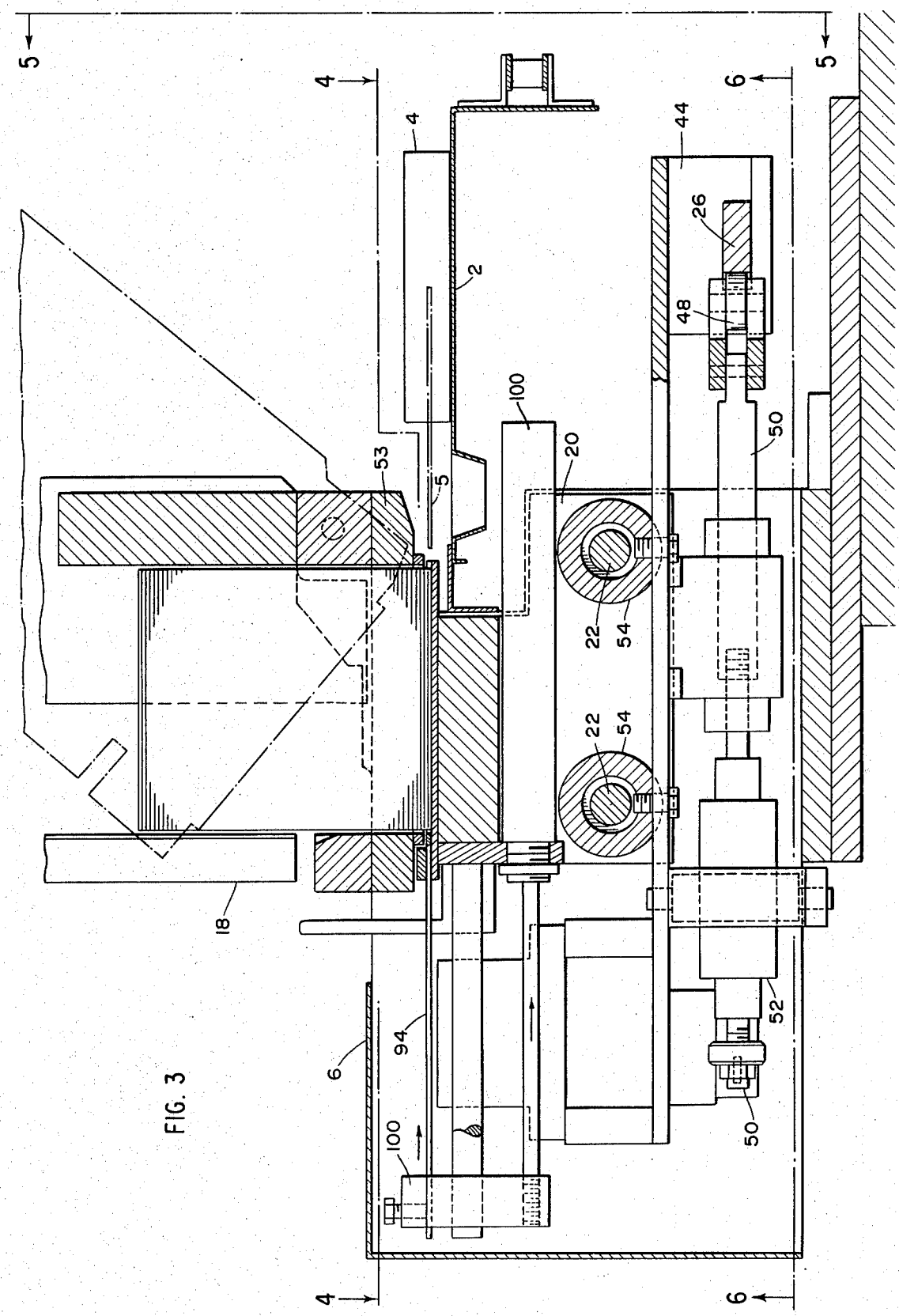
FIG. 3 is a front elevational view, in section, of the stick insertion mechanism, in accordance with this invention.
Figure 6:
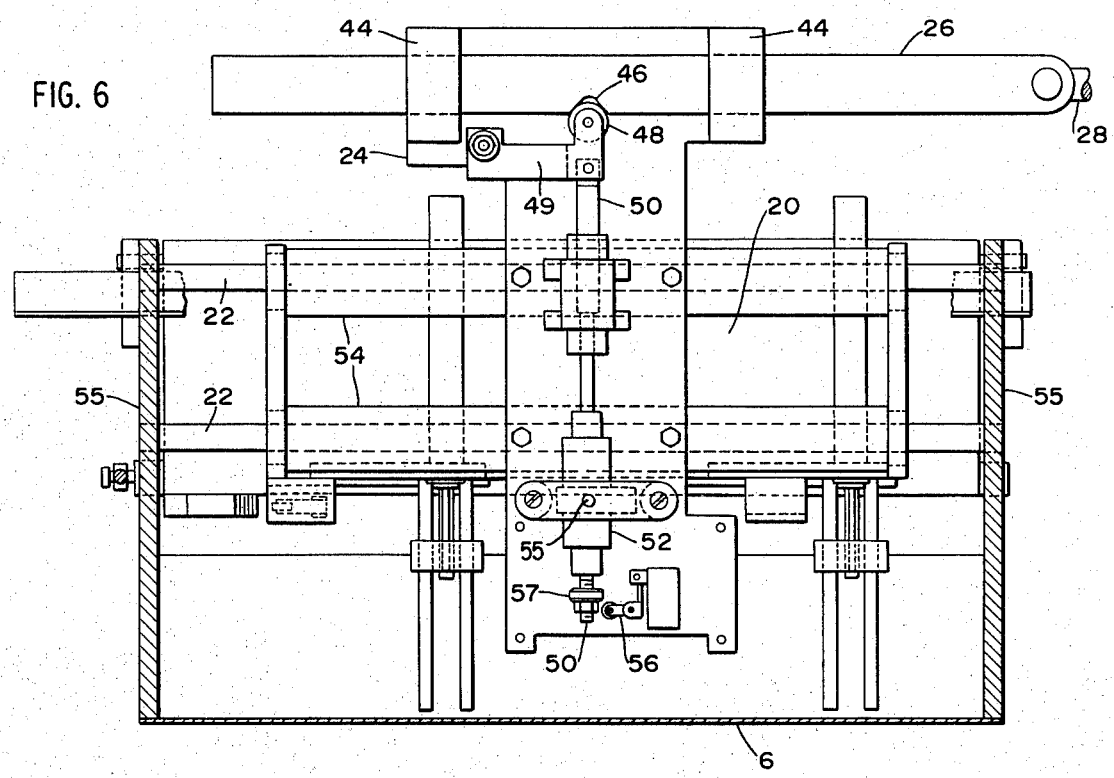
FIG. 6 is a bottom view, in section, of the stick insertion mechanism, in accordance with this invention.

Referring to FIGS. 2, 3, and 6, the sticker mechanism 6 and that part of the cam operated drive system 27 associated with it are shown. The sticks 5 are loaded into vertically oriented chutes 18 which supply the sticks to carriage 20 located below the bottom of chutes 18. Referring to FIG. 6, the carriage 20 is free to travel along a pair of ball bushing rods 22 on ball bushing tubes 54, which are supported by walls 55, and run parallel to the conveyor 2. The drive bar 26, of the drive system 27, mechanically engages carriage arm 24, attached to carriage 20. Drive bar 26 is connected by shaft 28 to the cam follower 30, which is mounted on the cam follower control arm 32. The cam follower control arm 32 is pivotally connected at 36 to the work table 10 and is supported by bearing block 34. The length of control arm 32 compared to the travel of the cam follower 30 is sufficient to allow the cam follower to follow an approximately straight line path. A chain 38 connects tensioning member 40 to the cam follower control arm 32, and pulls the cam follower 30 into engagement against cam 42.

Referring to FIG. 6, the drive bar 26 is slidably supported on a pair of bearing blocks 44, which are attached to carriage arm 24. A pressurized cylinder 52 is pivotally attached at 55 to the base of carriage 20. A two-way piston contained in cylinder 52, extends from both ends of cylinder 52 and has a shaft 50 attached to it. A roller bearing 48, mounted on arm 49, is pressed into depression 46, in drive bar 26, by the cylinder 52. An automatic one-way cam follower 56 is also attached to the base of carriage 20 and arranged so that cam 57, attached to the other end of shaft 50, will trip it, if bearing 48 is forced out of depression 46 towards cylinder 52.

Figure 11:
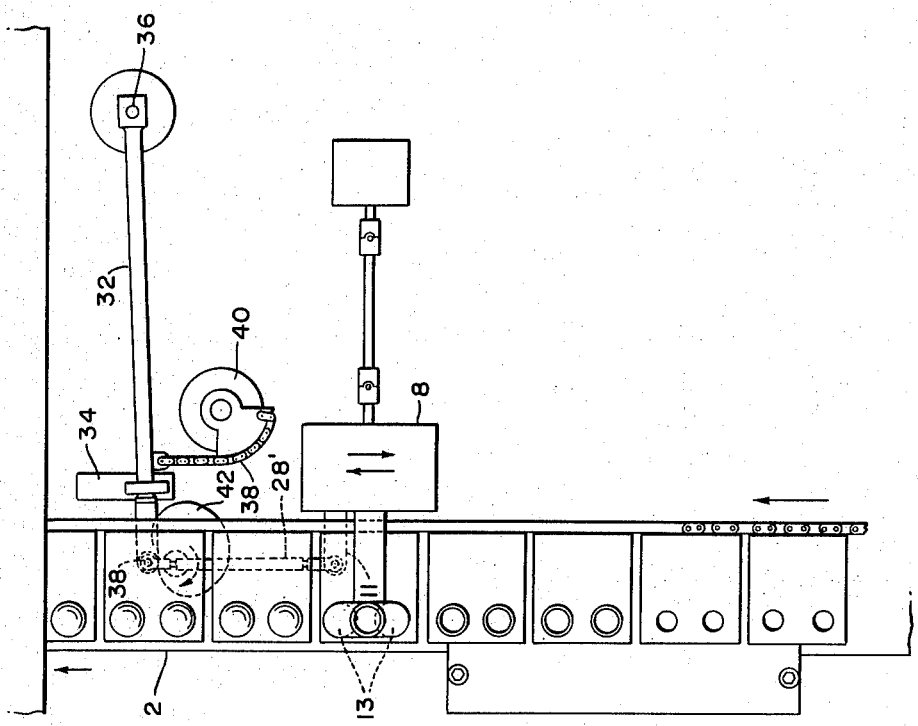
FIG. 11 is a plan view showing the cam operated drive system connected to the cone filler, in accordance with this invention.
Figure 10:
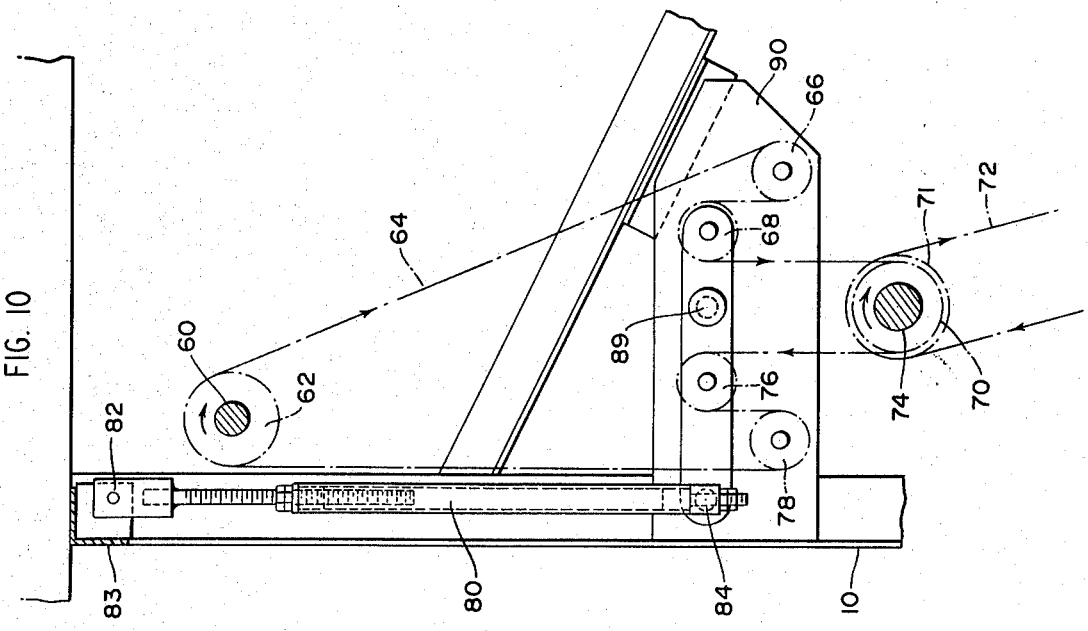
FIG. 10 is a plan view of the power train for the cam operated drive system, in accordance with this invention.

Referring to FIGS. 10 and 11, the details of the cam 42 drive system are shown. The cam 42 is mounted on drive shaft 60 which extends through the work table 10. Cam drive sprocket 62 is attached to shaft 60, below table 10 where it engages the cam drive chain 64 which passes over a pair of counter-rotating idlers 66 and 68 and then over the cam chain drive sprocket 70, which is mounted on the main drive jack shaft 74. Sprocket 71, attached to the main drive jack shaft 74, drives the conveyor 2 through chain 72 and conveyor drive 12. After passing around the cam chain drive sprocket 70, chain 64 passes over another pair of counter-rotating idlers 76 and 78 and then returns to the cam drive sprocket 62. Thus cam drive gear 62 is synchronously connected to the main drive conveyor drive 12. Idlers 68 and 76 are mounted on a beam 88 that is pivotally attached at 89 to bearing plate 90; the idlers being arranged so that chain 64 is in contact with them along a 180° arc. The other pair of idlers 66 and 78 are supported on bearing plate 90. A turn buckle 80 is fastened to beam 88, by pin 84, at the end closest to the edge of work table 10 and at its other end, by pin 82, to a supporting member 83 of work table 10.

Figure 4:
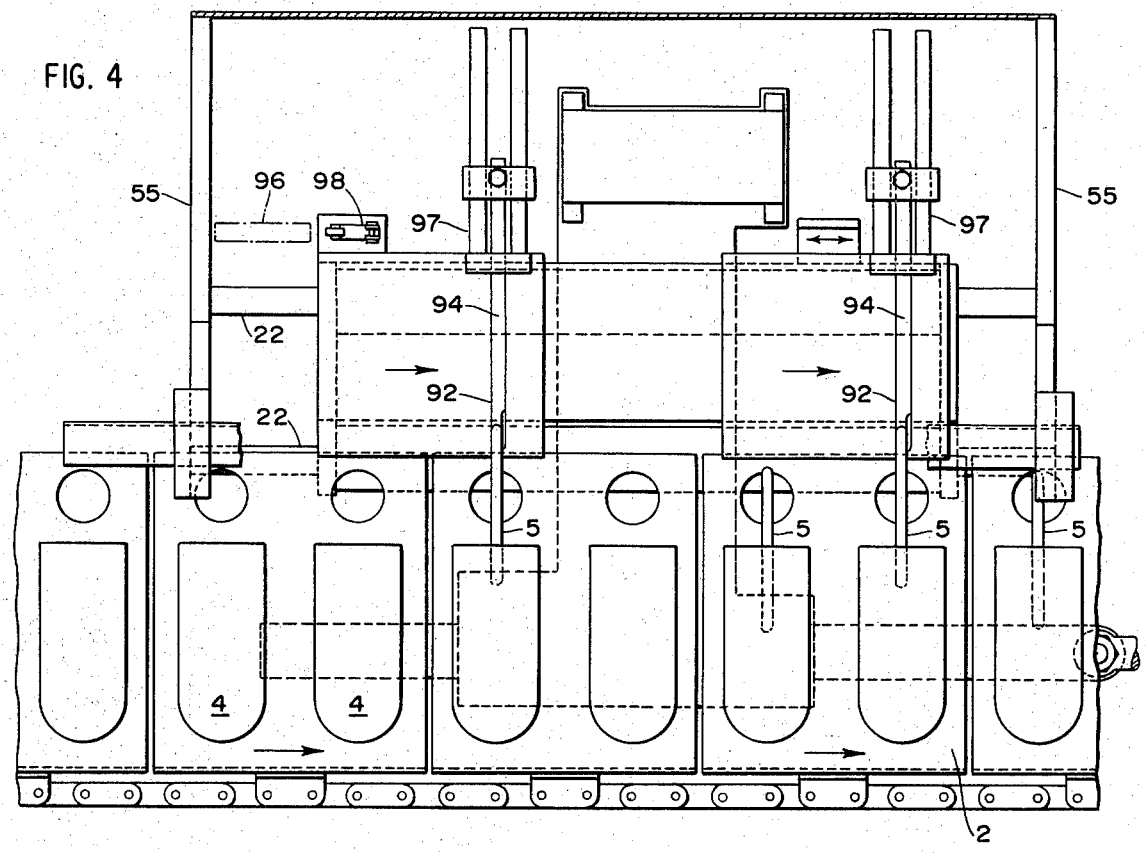
FIG. 4 is a plan view of the mechanism of FIG. 3.
Figure 5:
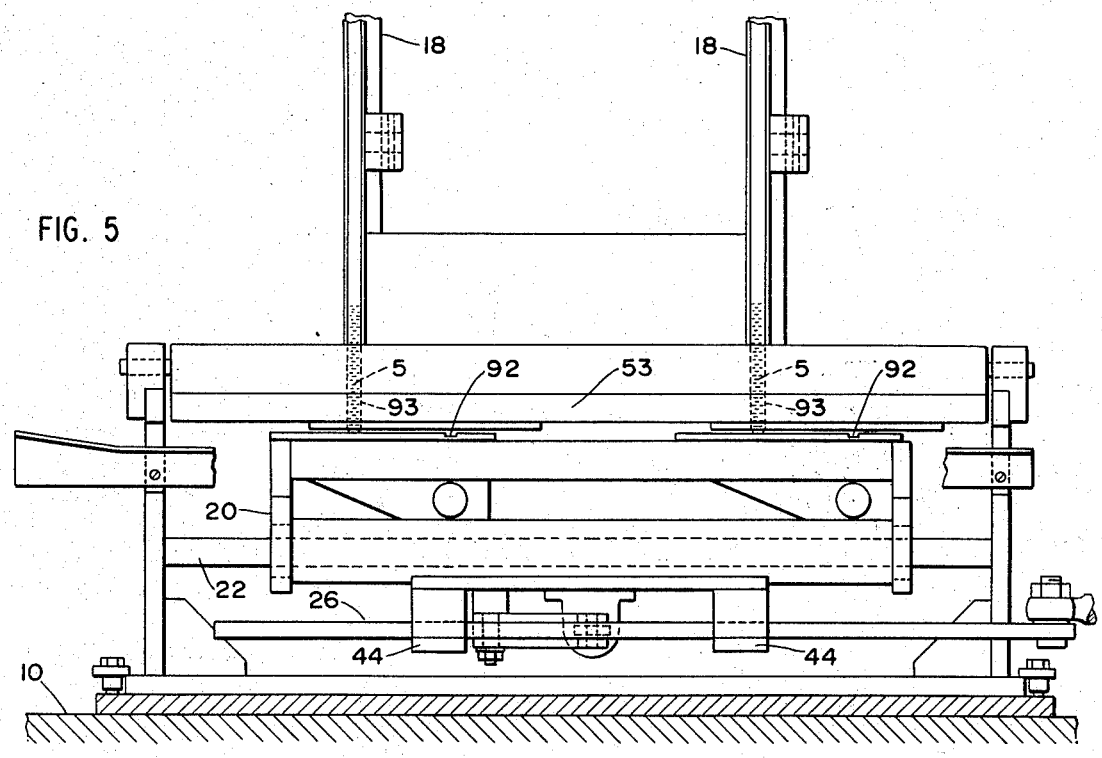
FIG. 5 is a right elevational view of the stick insertion mechanism, in accordance with this invention.

The details of the manner in which a pair of sticks are simultaneously fed from chutes 18 into a pair of food product bars 4 are best illustrated with reference to FIGS. 3 through 5. The sticks are stacked in chutes 18. Carriage 20 begins its cycle, when it is furthest away from cam 42. At this point, stick slots 92, in the top of carriage 20, are directly in line with a pair of corresponding slots 93 extending through plate 53 of sticker mechanism 6, below chutes 18. The slots 92 are deep enough to receive only one stick and, in this initial position of its cycle, the carriage 20 dwells, at this point, long enough for the sticks to fall into the slots 92. The clearance between the top of carriage 20 and bottom of plate 53 is less than the thickness of one stick, so slots 93 are closed by the smooth upper surface of carriage 20 after it begins to move. The stick inserter elements 97 are activated when cam 96, attached to the bottom of plate 53, trips the one-way cam follower 98 attached to the top of carriage 20. Cam 96 is positioned so that the sticks do not intercept the bars 4 until they are moving at the same speed as conveyor 2.

Chutes 18 are mounted on the upper surface of plate 53. Both plate 53 and rods 22 are attached to walls 55, which are in turn fastened to work table 10. Thus carriage 20 reciprocates below chutes 18, which remain in a fixed position. In this embodiment the carriage 20 carries two stick inserters 97 which simultaneously insert one stick each into a pair of product bars 4, which are 11¼ inches apart, on center. The centerline distance between each product bar 4 on conveyor 2 is 3¾ inches and they pass by sticker mechanism 6 at a rate of 120 bars per minute. Thus the maximum period of each cycle of carriage 20 is one second. I have found that a carriage stroke of approximately 3 11/16 inches is compatible with these design constraints.

The sticks 5 are forced out of slots 92 by pusher flats 94, which are connected to two-way pistons contained within drive cylinders 100. After the sticks 5 are inserted, the carriage 20 continues to track conveyor 2 until stick pusher flats 94 have been retracted far enough to clear the ends of the inserted sticks 5. The proper timing, of this retraction phase, is again controlled by cam 96. Carriage 20 then reverses its motion and quickly returns to the beginning of its cycle to receive another pair of sticks.

Referring to FIG. 7, a schematic of the pneumatic control circuit for the stick insertion mechanism is shown. Compressed air enters the pneumatic circuit through line 106 where it feeds into lines 108, 110, 112, 142 and 172. When valves 122, and 126 are in the position shown, air passes through valve 114 into line 118 through valves 120 and into one end of cylinders 100, causing the piston rods 95 to extend and remain in a extended position. During the process of extension, the air compressed by cylinders 100 is vented to the atmosphere through restrictions 136, line 134 and valve 114. When the one-way cam follower 98 is tripped by cam 96, valve 122 opens and air is free to pass through line 108 valve 126, and line 132 to activate pilot 110. Pilot 110 switches valve 114, which then directs air into line 134, where it passes through valves 140 and enters into the opposite end of cylinders 100. The air entering this end of cylinders 100 drives the two-way pistons towards the conveyor 2. During this insertion process, air is vented from the other side of cylinders 100, through restrictions 138 line 118 and valve 114. When the one-way cam follower 98 is released, valve 122 returns to its initial position and pilot 110 is de-energized, thus causing valve 114 to return to its normal operating position and the piston rods 95 to extend. As the carriage 20 begins its return cycle, the one-way cam follower 98 again hits cam 96. This action, however, does not affect valve 122, as this is the insensitive direction of the one-way cam follower 98.

If valve 126 is manually switched to its alternate position, the stick inserter circuit can be controlled manually through valve 130.

As earlier mentioned, one problem, which may arise during operation, is that the sticks may not fall cleanly into the slots 92 and may prevent the carriage 20 from moving. The possibility of such a jam causing damage to either the driving system 27 or the sticker mechanism 6 is minimized, by the releasable drive linkage as illustrated in FIG. 6. When the force required to move carriage 20, exceeds a pre-set threshold level, drive bar 26 is released and the drive system 27 can continue to operate, without imparting any force to carriage 20. The maximum force that can be transmitted to the carriage arm 24 by the drive bar 26 is governed by the pressure applied to the drive bar by piston 50, since piston 50 is forced, by a pressurized cylinder 52, against the drive bar 26, which is, in turn, forced against bearing blocks 44. A roller bearing 48, operated by the end of piston 50, rests in depression 46 formed in drive bar 26, and is restrained from lateral movement by lever 49 which is pivotally attached to carriage arm 24. Any tendency for relative motion to arise, during normal operations, between the roller bearing 48 and the drive bar 26 is resisted by the force applied by piston 50. This force determines the threshold mechanical force at which disengagement between the main drive system 27 and carriage 20 will occur. When a jam occurs and this threshold is exceeded, bearing 48 is forced out of depression 46. When piston 50 is thus deflected, cam 57 will trip the one-way automatic cam follower 56 which will decompress cylinder 52 through the bleeder 150 and cause piston 50 to retract. Drive bar 26 is then free to slide through carriage arm 24, without transmitting any force to the jammed carriage.

Referring to FIG. 7, the threshold pressure of cylinder 52 is controlled by pressure regulator 144. During normal operation, the air passing through line 142 passes through the pressure regulator 144, valve 146 and into line 152, where it pressurizes the cylinder 52. The position of valve 146 is governed by bleeder valves 148 and 150. Should the piston 50 be compressed by drive bar 26, the one-way automatic cam follower 56 switches valve 154, which activates bleeder 150, which in turn causes valve 146 to switch the pressure from line 142 into line 160. A portion of this air then flows through line 164, needle valve 166 and activates a noise making vibrator 168 to attract the attention of the system operator. The rest of the air passes through line 162, where it drives the two-way piston 50 in the opposite direction, thus causing it to the release drive bar 26. The pressurized air, previously stored in cylinder 52, is released through line 152 and valve 146.

In order to clear the apparatus, the stick mechanism may be tilted up. As shown in FIG. 2, levers 7 are attached to clamps mounted flush with the base of plate 53, adjacent to the stick slots 93. When the operator wishes to raise plate 53, he can clamp the bottom sticks in chutes 18 in position, to prevent them from falling out and activate tilt valve 174 which raises plate 53 as piston 184 extends from cylinder 178. Once the jam is cleared, the tilt valve is again manually operated thus causing piston 184 to retract and close top 53. The carriage 20 is then manually returned to the point where it begins its cycle. Levers 7 are returned to their normal position and reset valve 170 is then manually operated to activate bleeder 148, thus causing valve 146 to also return to its normal position. When cylinder 52 is again repressurized and piston 50 is extended, roller bearing 48 is again brought to bear against drive bar 26. When drive bar 26 returns to the corresponding position of its cycle, the roller bearing 48 reseats itself in depression 46 and the driving force will be transmitted to carriage 20. After the drive system is re-engaged, the sticker mechanism 6 will operate in synchronization with the conveyor. It should be noted that since the one-way cam follower 56 activates valve 154 only when force is applied from one direction, the re-extension of piston 50 does not cause valve 154 to operate, as cam 57 again passes cam follower 56. If for any reason it is desirable to manually disengage the carriage 20 from the drive bar 26, valve 158 can be manually activated, to retract piston 50.

Figure 9:
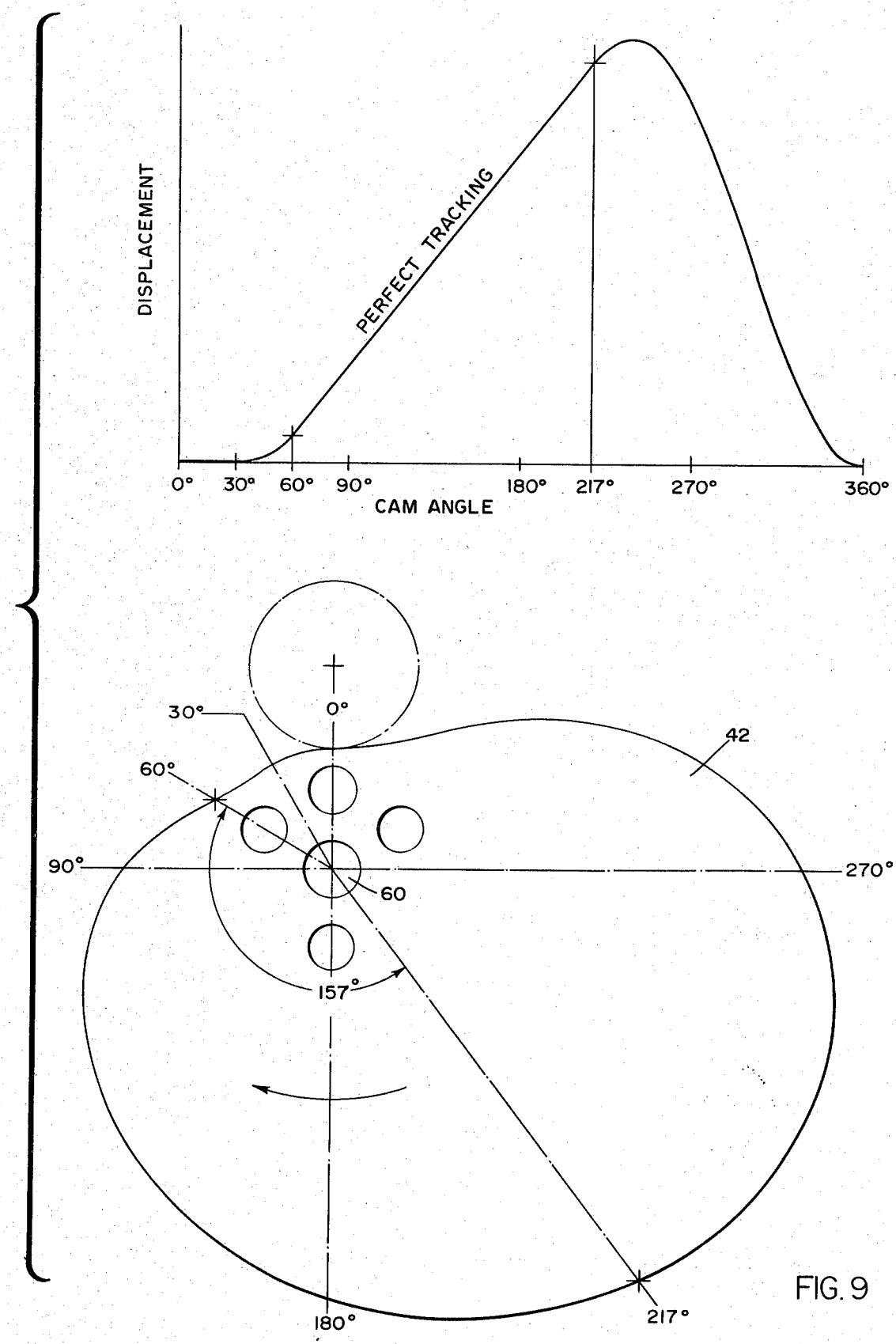
FIG. 9 is a plan view of the drive cam and a representation of its displacement curve, in accordance with this invention.

Cam 42 is designed to displace cam follower 30 in accordance with the displacement curve in FIG. 9. The beginning of the reciprocation cycle, of carriage 20, corresponds to the intersection of the cam perimeter with the vertical positive axis, of the axes therein shown with their origin at its center of rotation. Moving in a counter clockwise direction from the vertical axes, the rate of change of the cam radius with increasing cam angle is zero, for approximately 30°. This first arc sector corresponds to the stationary period of carriage 20. For the next 30°, the second derivative of cam radius with respect to the change in cam angle is positive. This arc sector corresponds to the acceleration period of the carriage 20. For the next 157°, the first derivative of cam radius, with respect to the change in cam angle, is approximately constant. This sector corresponds to the portion of the cycle where the carriage 20 moves at a velocity equal to that of conveyor 2. The cam is designed in its remaining sector to quickly and smoothly return carriage 20 to its initial position. In this preferred embodiment, the cam 42 is designed to operate at 60 R.P.M. for a conveyor speed of approximately 37.4 ft./min.

As noted above, cam 42 is synchronously connected to the drive system for conveyor 2. Since the operation of the sticking mechanism is controlled by the position of the carriage 20, it should be phase adjustable with conveyor 2, to insure that the sticks are inserted in the proper location on the ends of product bars 4. Referring to FIG. 10, phase adjustment between the sticker mechanism 6 and the conveyor 2 is accomplished by adjusting turn buckle 80 and changing the distance between pins 82 and 84. In this manner the length of the cam drive chain 64, on the opposite sides of shafts 60 and 74, can be altered and the phase of the cam drive sprocket 62, with respect to the cam chain drive sprocket 70, varied. Since this operation can be performed while the conveyor 2 and the sticker mechanism 6 are running, phase adjustments of the sticker mechanism 6, can be easily made without interrupting production.

Figure 8:
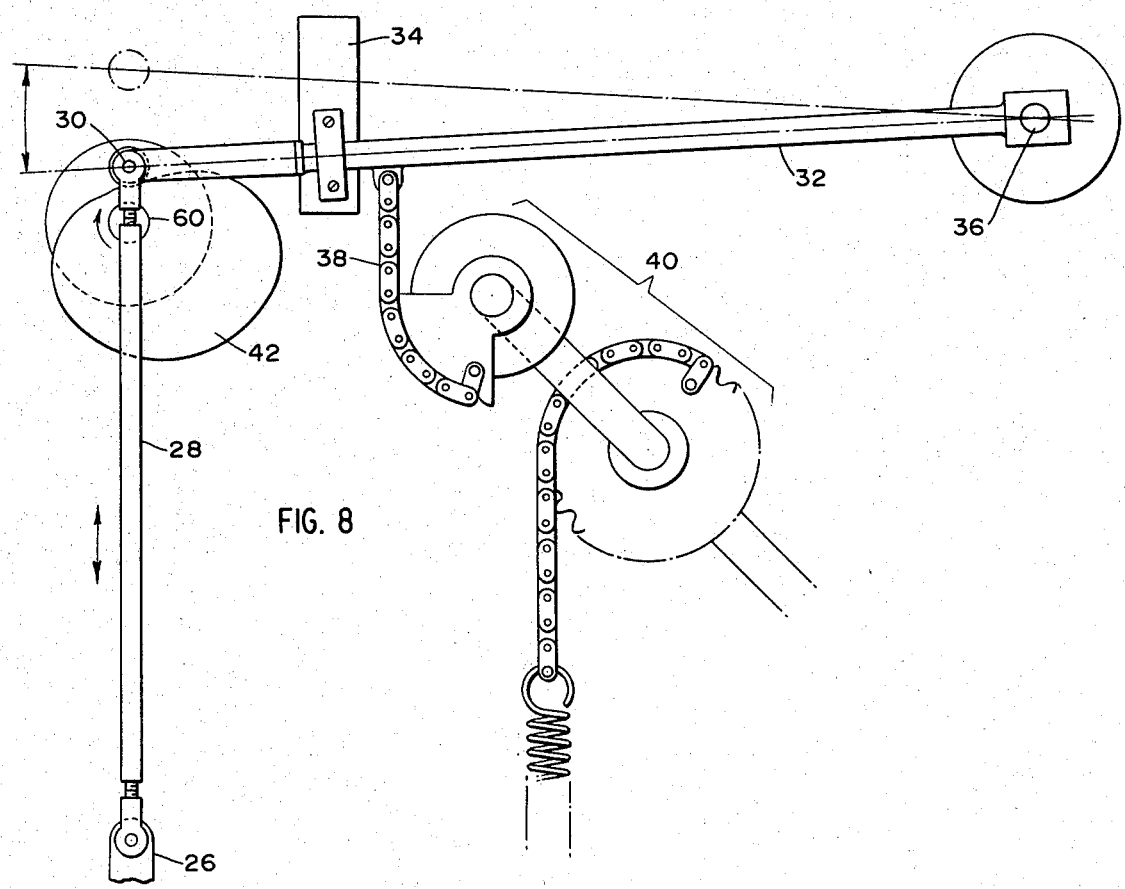
FIG. 8 is a plan view of the cam operated drive system, in accordance with this invention.

The drive system shown in FIGS. 2 and 8 is suitable for driving any mechanism that must perform an operation, such as depositing decorative articles or applying a decorative design, to the food product bars as they pass by. Referring to FIG. 11, this same drive system is shown connected to a cone filler mechanism 8. This switchover is accomplished as follows: spring 40 is relaxed thus allowing chain 38 to be fully extended to a position where the cam follower 30 is clear of cam 42 as it continues to rotate. Link 28 is then disconnected from cam follower 30 and replaced by a connecting link 28' of proper length, which can then be attached to the drive attachment point 11 of the cone filler 8. The spring 40 is then released, causing the cam follower 30 to again ride along cam 42 thereby imparting the same reciprocating motion to cone filler 8. Thus, ice cream is deposited in the cones, as the nozzles 13 synchronously track them. Obviously, this same cam operated drive system can be used to drive one or more tracking systems simultaneously.

Since certain changes may be made in the above construction without departing from the scope of the invention, it is intended that all matter contained in the above description or shown in the accompanying drawings shall be interpreted as illustrative and not interpreted in the limiting sense.

Having described my invention, what I claim is:

1. An apparatus for inserting sticks into food products carried along by a conveyor driven by a main drive means, comprising:
   a carriage;
   carriage drive means for moving said carriage along a path substantially parallel to the direction of motion of said conveyor, the velocity of said carriage over a portion of said path being substantially the same as the velocity of said conveyor; said carriage drive means being synchronously connected to the main drive means for said conveyor; and further comprising:
   a rotatable cam synchronously connected to said main drive means;
   a rotatable cam follower;
   means for causing said cam follower to bear against said cam; and
   means for connecting said cam follower to said carriage, including a mechanical engagement means comprising:
   a drive bar having a depression;
   bearing support means attached to said carriage;
   a rotatable member;
   a shaft connected to said rotatable member;
   forcing means attached to said shaft for causing said rotatable member to bear against said drive bar at said depression, and force said drive bar against said bearing support means;
   means for controlling the force exerted by said forcing means;
   means for relieving said forcing means when said rotatable member is forced out of said depression;
   stick insertion means attached to said carriage, for inserting said sticks into said food products during said portion of said path when said velocities are substantially the same, and
   stationary stick loading means for supplying said sticks to said carriage.

2. The apparatus according to claim 1 wherein said forcing means comprises a pressurized piston.

3. The apparatus according to claim 2 wherein said insertion means comprises:
   a stick slot for receiving said sticks, from said stick loading means, said slot being directed towards said conveyor;
   a pneumatic piston for forcing said stick out of said slot and into said food product;
   a valve for causing said piston to eject or retract; and
   pneumatic switching means for causing said valve to operate.

4. The apparatus according to claim 3 wherein said switching means operates in timed relationship to the movement of said carriage.

5. The apparatus according to claim 1 further comprising phase adjustment means for adjusting the phase of said carriage drive means with respect to said main drive means.

* * * * *